United States Patent Office 3,047,554
Patented July 31, 1962

3,047,554
POLYMERIZATION CATALYST OF COBALTOUS CHLORIDE AND ALUMINUM TRIISOBUTYL FOR VINYL ACETATE
Frank P. Gay, Wilmington, Del., assignor to E. I. du Pont de Nemours and Company, Wilmington, Del., a corporation of Delaware
No Drawing. Filed Apr. 23, 1957, Ser. No. 654,451
1 Claim. (Cl. 260—89.1)

This invention relates to polymerization of vinyl-type monomers, and more particularly, to a novel catalyst system effective to promote polymerization of vinyl-type monomers having attached polar radicals containing no ionizable hydrogen atoms, and to the polymerization of vinyl-type monomers having attached polar radicals containing no ionizable hydrogen atoms, in the presence of said catalyst system.

The vinyl-type monomers with which this invention is particularly concerned are the ethylenically unsaturated monomers containing polar groups which do not have ionizable hydrogen atoms. Particular examples of such monomers include vinyl acetate, vinyl chloride, acrylonitrile and methyl acrylate. Preferred polymerization initiators heretofore employed for the polymerization of these monomers are the so-called "free radical catalysts," such as the organic peroxides (benzoyl peroxide, hydrogen peroxide, diacyl peroxide, etc.), and aliphatic azo compounds of the type described and claimed in U.S. Patent 2,471,959 to M. Hunt. The effectiveness of various catalysts which promote ionic polymerization varies from monomer to monomer. For example, because of the relative ineffectiveness of many ionic type catalysts, e.g., Friedel-Crafts, for polymerizing vinyl acetate, the polymerization of this monomer is carried out by free-radical initiators, such as the above-mentioned organic peroxides. Free radical polymerizations are also preferred in converting such monomers as vinyl chloride and methyl acrylate to high polymers.

An object of this invention is to provide a novel catalyst system effective to promote polymerization of vinyl-type polymers having attached polar radicals containing no ionizable hydrogen atoms. A further object is to provide a novel catalyst system which is particularly effective in the bulk polymerization of the aforementioned vinyl-type monomers, and in the polymerization of such monomers carried out in a liquid polar solvent containing no ionizable hydrogen atoms. Still another object is to provide a novel catalyst system effective for promoting the polymerization of ethylenically unsaturated monomers. A further object is to provide a process for the polymerization of vinyl-type polymers having attached polar radicals containing no ionizable hydrogen atoms. These and other objects will more clearly appear hereinafter.

The foregoing objects are realized by the present invention which, briefly stated, comprises polymerizing under substantially anhydrous conditions an ethylenically unsaturated monomer having an attached polar radical containing no ionizable hydrogen atoms, in the presence of catalytic amounts of a catalyst system comprising essentially an admixture of (1) a compound containing at least one metal from the group consisting of nickel, and cobalt, said metal having directly attached thereto at least one element from the group consisting of the halogens, and oxygen, and (2) a reducing compound having metal attached directly thru a single bond (valence) to a carbon atom from the group consisting of trigonal carbon and tetrahedral carbon.

The reducing compound has been defined as a compound having metal attached directly to a trigonal or tetrahedral carbon atom. The term "trigonal carbon" means a carbon atom having 2 single bonds and a double bond, e.g.,

Examples of groups attached to metal, wherein the metal is attached to trigonal carbon, are aryl groups or aryalkyl groups. By "tetrahedral carbon" is meant a carbon atom having 4 single bonds, e.g.,

Examples of groups attached to a metal atom, wherein the carbon attached to the metal is tetrahedral, are alkyl groups, alkaryl groups and alkenyl groups.

As examples of compounds containing at least one metal from the group consisting of nickel and cobalt, said metal having directly attached thereto at least one element from the group consisting of the halogens and oxygen, there may be mentioned nickelous bromide, nickelous chloride, nickelous oxide, nickelic oxide, nickel peroxide, nickelous hydroxide, cobaltous chloride, cobaltic chloride, cobalt hexammonium chloride, cobaltous bromide, cobaltous chlorate, cobaltic oxide, etc.

As examples of reducing compounds having metal attached directly to carbon, to be used in admixture with the aforementioned compounds of nickel and cobalt, there may be mentioned aluminum triisobutyl, zinc diisobutyl, lithium aluminum tetradecyl, lithium butyl, ethyl magnesium bromide, aluminum isobutyl dichloride, aluminum isobutyl dibutoxide, aluminum diisobutyl butoxide, etc.

The catalyst system of this invention is particularly effective in the bulk polymerization of ethylenically unsaturated monomers having attached polar radicals containing no ionizable hydrogen atoms, and in the polymerization of such monomers carried out in a liquid aliphatic polar solvent containing no ionizable hydrogen atoms.

By "bulk polymerization" is meant polymerization that takes place without a solvent or other medium. The monomer, however, should be a solvent for the polymer formed therefrom.

Polar radicals are those containing polar bonds. Polar bonds, for purposes of this invention, may be defined as bonds which contain carbon and some other atom, the other atom possessing at least a lone pair (unshared pair) of electrons. A general discussion of polar bonds may be found in "The Electronic Theory of Organic Chemistry" by M. J. S. Dewar.

The expression "containing no ionizable hydrogen atoms" as applied to (1) the polar radicals attached to ethylenically unsaturated monomers and (2) to the "aliphatic polar solvents" specified herein means that the polar radicals (attached to ethylenically unsaturated monomers) and the aliphatic polar solvents do not ionize in the specific reaction medium and under the conditions of the reaction (when they are dissolved or are in a liquid state), to produce hydrogen ions (protons).

In carrying out the polymerization in solvent media, the preferred solvents are the liquid aliphatic polar solvents containing no ionizable hydrogen atoms. Typical examples of such solvents include esters such as ethyl acetate and butyl acetate, nitriles such as acetonitrile and propionitrile, ethers such as 1,4-dioxane, tetrahydrofuran and diethyl ether, and amides such as N,N-dimethyl formamide and N,N-dimethylacetamide. Examples of types of solvents which do contain ionizable hydrogen atoms are alcohols and carboxylic acids. In carrying out polymerization in the presence of an aliphatic polar solvent containing no ionizable hydrogen atoms, the presence of organic liquids other than the solvent itself and the monomer being polymerized should be avoided. Minute amounts of organic liquids associated with the catalyst system, and which do not act to inhibit or poison the polymerization, may be tolerated. Organic solvents which tend to inhibit or poison the polymerization system are, of course, solvents which have polar groups containing ionizable hydrogen atoms such as alcohols and carboxylic acids. Furthermore, aromatic polar compounds appear to inhibit the polymerization, examples of such compounds being anisole and benzonitrile.

In carrying out the polymerization in bulk form, the monomer to be polymerized must be a solvent for its polymer. That is, as the polymer is formed, it remains in solution. The presence of other organic liquids in the system should be kept to a minimum and should be present in only relatively minute amounts, based upon the amount of monomer present in the system. In many cases, the presence of relatively minute amounts of aliphatic hydrocarbon solvents which are associated with the catalyst system may be present, and they have no deleterious effect upon the reaction.

Typical examples of ethylenically unsaturated monomers having attached polar radicals containing no ionizable hydrogen atoms include vinyl formate, vinyl acetate, vinyl pivalate, vinyl stearate, vinyl benzoate, 4-vinyl pyridine, methyl acrylate, methyl methacrylate, vinyl chloride, acrylonitrile, vinyl ethyl ether, vinyl isobutyl ether, allylidene diacetate, and methoxy butadiene. The present process and catalysts are useful for preparing copolymers as well as homopolymers of these polymerizable compounds.

The components of the catalyst system are normally employed in catalytic quantities. The mol ratio of the reducing agent to the compound containing nickel, and/or cobalt attached to a halogen, and/or oxygen is normally at least 1/1. Optimum ratios will be found within the range from 1/1 to 100/1. The concentration of the component containing the metal element attached to halogen, and/or oxygen may be as low as 0.01–0.2 millimol to as much as 20 millimols, or higher, per liter of the components in the reaction medium, i.e., monomer and solvent.

The polymerizations employing the catalyst system of this invention may be carried out within a relatively wide latitude of temperature and pressure. Temperatures for the reaction may range from −80° C. to 140° C., and pressures for the reaction may range from atmospheric pressure to 400 atmospheres. Optimum conditions appear to be within the temperature range of 20° C. to 70° C. and at atmospheric pressure.

It is usually desirable to agitate the system continuously during the polymerization reaction. Further, it should be borne in mind that the catalyst systems defined herein are sensitive to the presence of excess water. Therefore, these processes must be carried out under substantially anhydrous conditions.

The following examples will serve to further illustrate principles and practice of this invention. Parts are by weight unless otherwise specified.

In the following examples, the degree of polymerization of the polymers formed in these examples is reflected by measurement of inherent viscosity. Inherent viscosity is measured by dissolving the polymer in a suitable solvent by agitating the mixture at an elevated temperature if necessary. The solution is cooled to 30° C., and the viscosity of this solution is measured relative to that of the solvent treated in the same manner. The time of efflux through a viscometer is measured for the solvent (no polymer present) in the solution of polymer in solvent. Inherent viscosity is calculated as follows:

Let $T_0$ = solvent flow time in seconds
$T_1$ = solution flow time in seconds $$\text{Relative viscosity} = \frac{T_1}{T_0}$$

In a table of natural logarithms, the natural logarithm of the relative viscosity is determined.

Inherent viscosity
$$= \frac{\text{the natural logarithm of relative viscosity}}{C}$$

where C is the concentration expressed in grams of polymer per 100 milliliters of solution.

Yield is based on the weight percent of initial charge of monomer.

In carrying out the examples which illustrate this invention, steps were taken to insure that the polymerization system was substantially anhydrous and that the components in the system were substantially free of contaminants. The polymerizable monomers, such as vinyl acetate, were passed through anhydrous silica gel, collected over anhydrous magnesium sulfate powder, and distilled through baked glassware under a stream of nitrogen directly from the desiccant. By Carl Fisher titration, a typical water analysis was in the neighborhood of 30–50 parts/million. Soluble catalyst components were generally introduced in a substantially dry solvent. Insoluble catalyst components, if they were not hygroscopic, were introduced dry by weight. If the insoluble materials were hygroscopic, they were introduced as a slurry in a suitable solvent.

All examples which do not indicate a temperature of the reaction were initiated at room temperature and permitted to proceed adiabatically.

*Example 1*

Distilled vinyl acetate (100 parts) was injected into a glass reaction vessel under a dry argon atmosphere. The reaction vessel was equipped with a magnetic stirring bar. Two parts of aluminum triisobutyl (2.25 molar in cyclohexane) and 0.8 part cobaltous chloride ($CoCl_2$) were added to the monomer, and the reaction was allowed to proceed adiabatically under an atmosphere of dry argon at atmospheric pressure.

After 100 minutes, 200 parts of dichloromethane and 4 parts of acetic acid were added to the reaction mass, and solid polyvinyl acetate was precipitated by pouring the resulting solution in 500 parts of pentane. The polyvinyl acetate was dried under a vacuum at 40° C. for 24 hours. The yield of polymer was 30%; and the inherent viscosity, measured as a 0.25% solution in acetone at 30° C., was 0.95.

*Example 2*

The procedure of Example 1 was followed, but nickel chloride ($NiCl_2$) was substituted for cobalt chloride. The yield of polyvinyl acetate was 17%, and the inherent viscosity of the polymer measured 0.90.

*Example 3*

Example 1 was repeated except that cobalt hexammonium chloride ($Co(NH_3)_6Cl_2$) was substituted for cobalt chloride. The measured viscosity of the resulting polymer was 0.91, and the yield was 17%.

*Example 4*

A glass reaction vessel fitted with a mechanical stirrer was charged under nitrogen with the following compounds:

| | |
|---|---|
| Dimethyl formamide | 50 milliliters. |
| Aluminum triisobutyl | 6 millimoles of a 1 molar solution in cyclohexane. |
| Anhydrous cobalt chloride | 2 millimoles. |
| Acrylonitrile | 40.6 grams. |

The reaction mixture was stirred at room temperature and allowed to proceed adiabatically for 17 hours. The reaction mixture was then quenched with water, and the polymer suspension was solidified by addition of dilute hydrochloric acid. The polymer was filtered, washed with water and with methanol, and finally dried. There was obtained 2.8 grams of polyacrylonitrile (corresponding to 7% yield) having an inherent viscosity of 0.82 (determined at 0.2% concentration in dimethyl formamide at 25° C.).

I claim:

A process which comprises polymerizing a polymerizable material consisting of vinyl acetate in bulk form and under substantially anhydrous conditions, in contact with catalytic amounts of a catalyst system comprising essentially an admixture of cobaltous chloride and aluminum triisobutyl.

References Cited in the file of this patent

UNITED STATES PATENTS

| | | |
|---|---|---|
| 2,391,920 | Peterson | Jan. 1, 1946 |
| 2,471,959 | Hunt | May 31, 1949 |
| 2,482,056 | Elwell et al. | Sept. 13, 1949 |
| 2,827,447 | Nowlin et al. | Mar. 18, 1958 |
| 2,832,759 | Nowlin et al. | Apr. 29, 1958 |
| 2,840,551 | Field et al. | June 24, 1958 |
| 2,881,156 | Pilar et al. | Aug. 7, 1959 |
| 2,910,461 | Nowlin et al. | Oct. 27, 1959 |
| 2,932,633 | Juveland et al. | Apr. 12, 1960 |

FOREIGN PATENTS

| | | |
|---|---|---|
| 534,792 | Belgium | Jan. 31, 1955 |